R. S. SWARTZ.
HAY LOADER.
APPLICATION FILED MAY 7, 1913.
1,096,326.
Patented May 12, 1914.
2 SHEETS—SHEET 1.
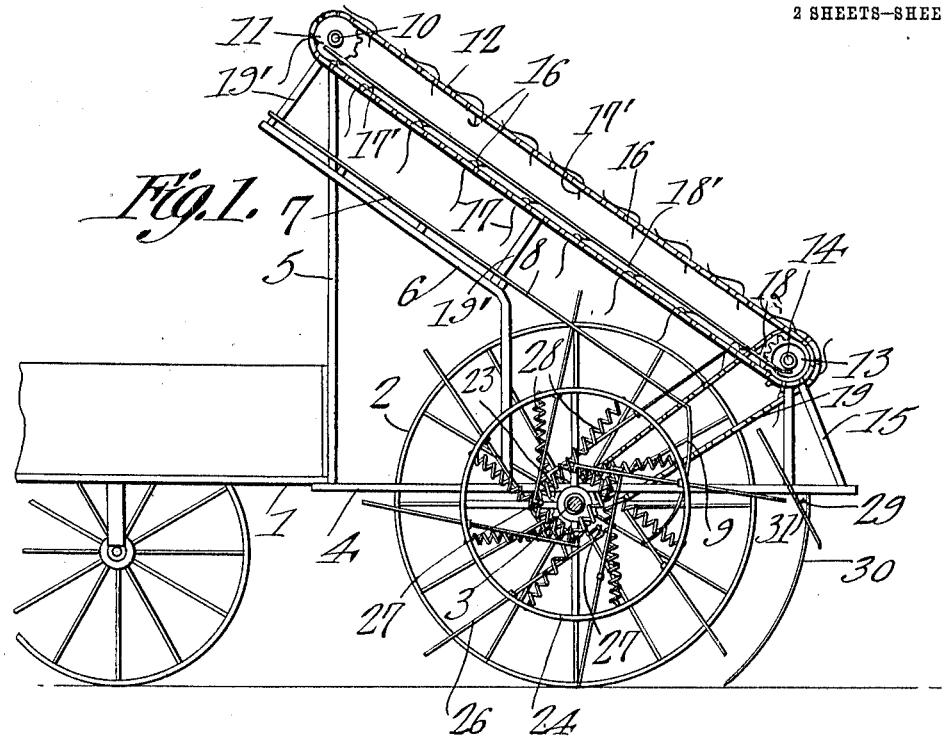
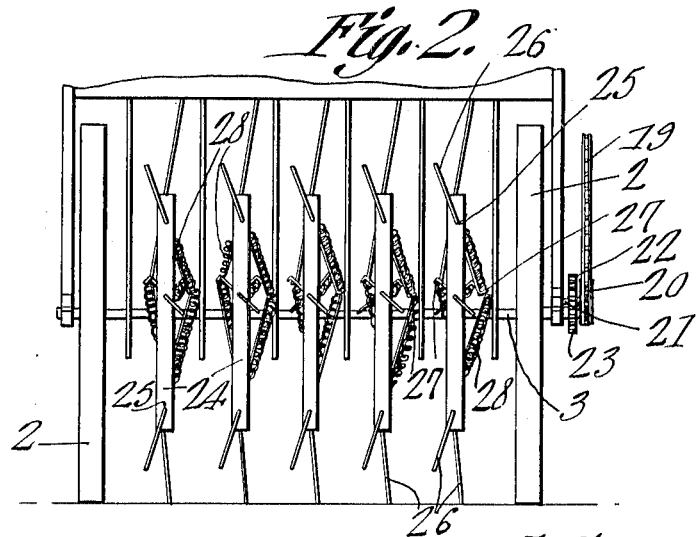
Witnesses
R. S. Swartz,
Inventor
by C. A. Snow & Co.
Attorneys

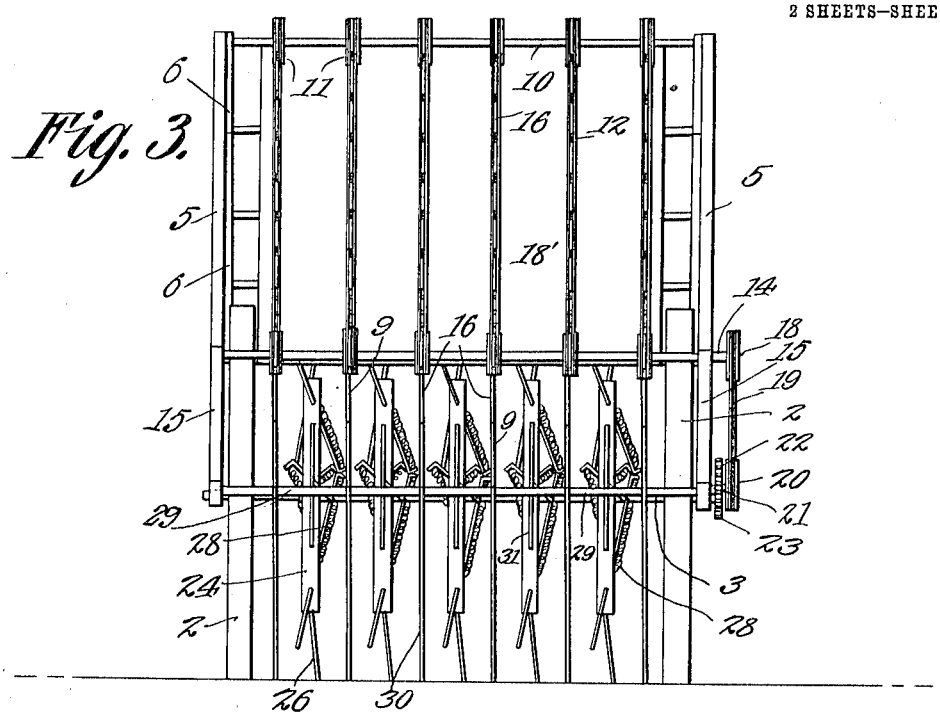

UNITED STATES PATENT OFFICE.

RILEY S. SWARTZ, OF HARPSTER, OHIO.

HAY-LOADER.

1,096,326.

Specification of Letters Patent. Patented May 12, 1914.

Application filed May 7, 1913. Serial No. 766,217.

*To all whom it may concern:*

Be it known that I, RILEY S. SWARTZ, a citizen of the United States, residing at Harpster, in the county of Wyandot and State of Ohio, have invented a new and useful Hay-Loader, of which the following is a specification.

This invention relates to machines for gathering hay and elevating it into wagons.
One of the objects of the invention is to provide mechanism of this character requiring no power for operating it other than that needed to draw the machine forward, the hay elevating means being operated by its supporting wheels while the means employed for raking up the hay and directing it against the elevating means, is operated by contact with the ground during the forward movement of the apparatus.
A further object is to provide improved means for gathering the hay, said means being made up of a series of independently operating units, each unit including means for yieldingly engaging the soil and for directing the engaged hay upwardly to the conveyer.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.
In said drawings:—Figure 1 is a side elevation of the apparatus, the near supporting wheel being removed, the axis being shown in section and with the left hand member 15 removed. Fig. 2 is a rear elevation of the axle, wheels and adjacent parts, the rake, deflecting fingers and elevator being removed. Fig. 3 is a rear elevation of the complete machine. Fig. 4 is a detail view of one of the gathering fingers and adjacent parts.
Referring to the figures by characters of reference 1 designates a suitable vehicle adapted to be loaded with the hay and the mechanism constituting the present invention is secured to the back end of this vehicle in any suitable manner. This mechanism includes supporting wheels 2 engaging an axle 3 and this axle supports side strips 4 constituting the base of a frame which includes standards 5 and side frame members
6. The frame may be secured to the vehicle 1 in any manner desired so as to move therewith. Mounted on the side frame members 6 is an inclined table 7 from the lower rear edge of which extend parallel spring arms 8 terminating at their rear ends in downwardly and forwardly curved fingers 9. A transverse shaft 10 is journaled upon the upper ends of the standards 5 and has sprockets 11 secured thereto, these sprockets being engaged by endless chains 12. Said chains also engage sprockets 13 secured to a transverse shaft 14, said shaft being journaled in brackets 15 upstanding from the rear end portions of the side strips 4. Chains 12 are connected in any suitable manner, as by means of cross cleats 16 and secured to these cleats and extending outwardly therefrom are teeth 17 adapted to travel close to and above the arms 8 and the table 7. These teeth 17 are hingedly connected to the cleats and have fingers 17' extending from the inner ends thereof and adapted to travel along the lower surface of a retaining board 18' which is extended close to and above the cleats of the lower flight and is held in place by suitably arranged brackets as indicated, for example at 19'. A sprocket 18 is secured to the shaft 14 and is adapted to be actuated by a chain 19 receiving motion through a sprocket 20 from a shaft 21 extending laterally from one of the side strips 4. This shaft has a gear 22 meshing with another gear 23 which is secured to and rotates with the axle 3.

Mounted to rotate freely upon the axle 3 and independently of each other are similar gathering units each of which includes a relatively small wheel 24 the rim of which is provided with apertures 25. Slidably mounted in these apertures are gathering fingers 26, each finger being provided at its inner end with a laterally projecting extension 27 to which is secured one end of a coiled spring 28. The other end of the coiled spring is secured to the rim of the wheel 24. Preferably eight of the fingers 26 are provided in each wheel 24 and the extension 27 on the fingers are extended in opposite directions alternately so that the outer end portions of alternate fingers 26 extend obliquely beyond one side of the wheel while the outer end portions of the remaining fingers extend obliquely beyond the other side of the wheel. This will be apparent by referring to Fig. 2. Each spring exerts a constant pull upon the inner end of the finger 26 to which it is attached so that the finger is thus normally projected outwardly relative to the wheel 24.

Secured to a cross bar 29 which connects the rear end portions of the side strips 4, are spring rake teeth 30 which are curved downwardly and forwardly substantially concentric with the axle 3. Additional fingers 31 extend in front of the bar 29 and are inclined upwardly and forwardly so as to direct material from the fingers 30 against the upper portions of the fingers 9 and thence onto the arms 8. The fingers 31 are so spaced as to permit the ends of the fingers 30 to travel therebetween.

When the vehicle 1 is drawn forward the wheels 2 are rotated because of their engagement with the ground and axle 3 is thus caused to turn, motion being transmitted from said axle through gears 23 and 22, sprocket 20 and chain 19 to sprocket 18 and shaft 14. Thus the endless conveyer or elevator formed of the chains 12, cleats 16 and fingers or teeth 17 will be actuated. Certain of the spring controlled gathering fingers 26 are constantly in engagement with the ground and, therefore, as the apparatus is moved forward, these fingers, which are in engagement with the ground, will be pushed upwardly, thereby elongating the springs 28 which are connected to said fingers and causing the fingers 26 to rock to a slight extent within their wheels 24. As the rake teeth 30 gather up the hay in the path thereof the fingers 26, as they move toward these teeth, are gradually projected by their springs 28 and ultimately assume positions close to the points of the rake teeth 30. Additional fingers 26 are thus brought into engagement with the soil whereupon those fingers adjacent the teeth 30 will move upwardly along said teeth and force the accumulated hay along teeth 30, against the deflecting fingers 31, and finally against the fingers 9 which coöperate with the arms 8 to withdraw the hay from engagement with fingers 26. The hay is engaged, while on arms 8, by the teeth or fingers 17 and is drawn upwardly along the table 7 until it reaches the upper end thereof whereupon it gravitates onto the vehicle 1. When the hay is engaged by the teeth 17, said teeth are held in engagement with the hay in view of the fact that the fingers 17' are prevented from swinging upwardly by the retaining board 18'. When, however, the teeth 17 reach their positions under the sprockets 11, the fingers 17' pass from under the board 18' and the teeth 17 are thus free to swing so as to withdraw readily from the hay and prevent the hay from being carried around the sprockets 11.

It will be understood that the spring controlled fingers 26 constitute the means for rotating the several gathering units independently of each other, these fingers being pushed inwardly when they come into contact with the ground and being projected outwardly by their springs when the fingers move out of contact with the ground. Thus the fingers serve not only to rotate the several units but also to force the gathered material along the fingers 30 in the manner hereinbefore described.

What is claimed is:—

1. The combination with a wheel supported axle, an inclined table, an endless conveyer for carrying material along the table to the upper end thereof, and means for transmitting motion to said conveyer from the axle, of units mounted on the axle and adapted to rotate independently of each other each including a wheel, ground engaging fingers slidable in the rim of the wheel, and means for holding the fingers yieldingly projected, rake teeth at the rear of said units and adjacent to said spring controlled fingers constituting means for forcing collected material upwardly along the rake teeth and into engagement with the conveyer, and means extending from the table for holding the elevated material to permit withdrawal of the ground engaging fingers therefrom.

2. Apparatus for loading hay, including rake teeth, a wheel supported axle in front thereof, and separate units upon the axle and revoluble independently of each other each including a wheel, ground engaging fingers slidable within the rim of the wheel, and springs connected to the fingers and wheels for holding the fingers yieldingly projected, said fingers constituting means for engaging the ground to rotate the wheel and for forcing accumulated material upwardly along the rake teeth.

3. A hay loader including rake teeth, a wheel supported axle, separate units mounted to rotate upon the axle independently of each other, each unit including an apertured rim concentric with the axle, fingers slidable within the apertures, and a spring connected to each finger and to the rim for holding the finger yieldingly projected, said fingers being adapted to engage the soil and rotate the units during the forward movement of the loader and to travel along the rake teeth to elevate material accumulated by said teeth.

4. A hay loader including rake teeth, a wheel supported axle, separate units mounted to rotate upon the axle independently of each other, each unit including an apertured rim concentric with the axle, fingers slidable within the apertures, and a spring connected to each finger and to the rim for holding the finger yieldingly projected, said fingers being adapted to engage the soil and rotate the units during the forward movement of the loader and to travel along the rake teeth to elevate material accumulated by said teeth, and means extending between the paths of the spring projected fingers for engaging the elevated material to hold it during the downward movement of the fingers to permit withdrawal of the fingers from the material.

5. A hay loader including rake teeth, a wheel supported axle, separate units mounted to rotate upon the axle independently of each other, each unit including an apertured rim concentric with the axle, fingers slidable within the apertures, and a spring connected to each finger and to the rim for holding the finger yieldingly projected, said fingers being adapted to engage the soil and rotate the units during the forward movement of the loader and to travel along the rake teeth to elevate material accumulated by said teeth, means extending between the paths of the spring projected fingers for engaging the elevated material to hold it during the downward movement of the fingers to permit withdrawal of the fingers from the material, an inclined table, an endless elevator for engaging the material elevated by the projected fingers and for dragging said material over the table, and means operated by the supporting wheels for actuating said conveyer.

In testimony that I claim the foregoing as my own, I have hereto affixed my signature in the presence of two witnesses.

RILEY S. SWARTZ.

Witnesses:
JOHN T. CAREY,
H. F. BARDON.

---

Copies of this patent may be obtained for five cents each, by addressing the "Commissioner of Patents, Washington, D. C."